(12) United States Patent
Takizawa et al.

(10) Patent No.: US 12,434,226 B2
(45) Date of Patent: Oct. 7, 2025

(54) REDUCING AGENT AND METHOD FOR PRODUCING GAS

(71) Applicant: SEKISUI CHEMICAL CO., LTD., Osaka (JP)

(72) Inventors: Koji Takizawa, Ibaraki (JP); Fiona Mukherjee, Ibaraki (JP); Kenichi Shinmei, Tsukuba (JP); Noritoshi Yagihashi, Ibaraki (JP); Risa Sakurai, Ibaraki (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 488 days.

(21) Appl. No.: 17/914,042

(22) PCT Filed: Mar. 3, 2021

(86) PCT No.: PCT/JP2021/008250
§ 371 (c)(1),
(2) Date: Sep. 23, 2022

(87) PCT Pub. No.: WO2021/192871
PCT Pub. Date: Sep. 30, 2021

(65) Prior Publication Data
US 2023/0330635 A1   Oct. 19, 2023

(30) Foreign Application Priority Data

Mar. 25, 2020  (JP) .................. 2020-054283
Mar. 25, 2020  (JP) .................. 2020-054284
Sep. 24, 2020  (JP) .................. 2020-159850

(51) Int. Cl.
*B01J 23/10* (2006.01)
*B01J 23/745* (2006.01)
(Continued)

(52) U.S. Cl.
CPC ............ *B01J 23/10* (2013.01); *B01J 23/745* (2013.01); *B01J 23/92* (2013.01); *B01J 38/10* (2013.01); *C01B 32/40* (2017.08); *C01F 17/32* (2020.01)

(58) Field of Classification Search
CPC . B01J 23/10; B01J 23/745; B01J 23/92; B01J 38/10; C01B 32/40; C01F 17/32;
(Continued)

(56) References Cited

U.S. PATENT DOCUMENTS 9,580,326 B1    2/2017  Miller et al.
11,845,660 B2 * 12/2023  Uddi ................. B01J 35/651
(Continued)

FOREIGN PATENT DOCUMENTS

CN     103831077      6/2014
EP     2 634 140      9/2013
WO     2012/057161    5/2012

OTHER PUBLICATIONS

Marcus Wenzel, N.V.R. Aditya Dharanipragada, Vladimir V. Galvita, Hilde Poelman, CO production from CO2 via reverse water-gas shift reaction performed in a chemical looping mode: Kinetics on modified iron oxide, Nov. 28, 2016, Journal of CO2 Utilization, 17, 60-68 (Year: 2016).*

(Continued)

*Primary Examiner* — Daniel Berns
*Assistant Examiner* — Joshua Maxwell Speer
(74) *Attorney, Agent, or Firm* — Wenderoth, Lind & Ponack, L.L.P.

(57) ABSTRACT

A reducing agent for use in production of a product gas containing carbon monoxide, the reducing agent being brought into contact with a raw material gas containing carbon dioxide to reduce the carbon dioxide to produce the product gas; the reducing agent containing a composite
(Continued)

metal oxide represented by $Ce_{1-x}(M)_xO_y$, where M is a metal element with an ionic radius smaller than an ionic radius of Ce with an identical valence number and an identical coordination number, x represents a positive real number, and y represents a real number from 1 to 4. The reducing agent that has a high conversion efficiency of carbon dioxide to carbon monoxide, and can be used, for example, in a chemical looping method, and a method for producing a gas using such a reducing agent.

12 Claims, 1 Drawing Sheet

(51) Int. Cl.
  *B01J 23/92*  (2006.01)
  *B01J 38/10*  (2006.01)
  *C01B 32/40*  (2017.01)
  *C01F 17/32*  (2020.01)
(58) Field of Classification Search
  CPC .................. C01F 17/241; C01P 2004/60; C01P 2004/61; C01P 2006/11; C01P 2006/12; C01G 25/00; C01G 27/00; C01G 49/00; C01G 49/06
  See application file for complete search history.

(56) References Cited

U.S. PATENT DOCUMENTS

2015/0147260 A1    5/2015  Idriss et al.
2016/0296916 A1*  10/2016  Kim .......................... B01J 35/58
2016/0332150 A1   11/2016  Fan et al.

OTHER PUBLICATIONS

Qingqing Jiang, Guilin Zhou, Zongxuan Jiang, Can Li, Thermochemical CO2 splitting reaction with CexM1xO2d (M=Ti4+, Sn4+, Hf4+, Zr4+, La3+, Y3+ and Sm3+) solid solutions, Nov. 26, 2013, Solar Energy, 99, 55-66 (Year: 2013).*

Extended European Search Report issued May 6, 2024 in corresponding European Patent Application No. 21775177.5.
Office Action issued May 14, 2024 in corresponding Chinese Patent Application No. 202180024593.3, with English-language translation.
Tao et al., "Finely Tuned Structure and Catalytic Performance of Cerium Oxides by a Continuous Samarium Doping from 0 to 100%", Inorganic Chemistry, 2019, vol. 58, No. 19, pp. 13066-13076.
Jaoude et al., "Synthesis and properties of 1D Sm-doped $CeO_2$ composite nanofibers fabricated using a coupled electrospinning and sol-gel methodology", Ceramics International, 2016, vol. 42, No. 9, pp. 10734-10744.
Ackermann et al., "Kinetics of $CO_2$ Reduction over Nonstoichiometric Ceria", The Journal of Physical Chemistry C, 2015, vol. 119, No. 29, pp. 16452-16461.
Office Action issued Oct. 21, 2023 in corresponding Chinese application No. 202180024593.3, with English translation.
Third Notice of Reason for Refusal issued Oct. 31, 2024 in corresponding Chinese Patent Application No. 202180024593.3, with English language translation.
International Search Report issued May 25, 2021 in corresponding International (PCT) Patent Application No. PCT/JP2021/008250.
Jiang, Q. et al., "Thermochemical $CO_2$ splitting reaction with $Ce_xM_{1-x}O_{2-\delta}$(M=$Ti^{4+}$, $Sn^{4+}$, $Hf^{4+}$, $Zr^{4+}$, $La^{3+}$, $Y^{3+}$ and $Sm^{3+}$) solid solutions", Solar Energy, 2014, vol. 99, pp. 55-66.
Park, J. H. et al., "Simultaneous conversion of carbon dioxide and methane to syngas using an oxygen transport membrane in pure $CO_2$ and $CH_4$ atmospheres", Journal of Materials Chemistry A, 2018, vol. 6, pp. 14246-14254.
"Kagaku Binran Basic edition II", the Chemical Society of Japan, Jun. 25, 1984, pp. 717-718.
Marcus Wenzel et al., "CO production from $CO_2$ via reverse water-gas shift reaction performed in a chemical looping mode: Kinetics on modified iron oxide", Journal of $CO_2$ Utilization, 17 (2017), pp. 60-68.
Office Action issued Mar. 7, 2025 in corresponding Chinese Patent Application No. 202180024593.3, with English machine translation.
Notice of Reasons for Refusal issued Dec. 10, 2024 in corresponding Japanese Patent Application No. 2022-509466, with English language translation.

* cited by examiner

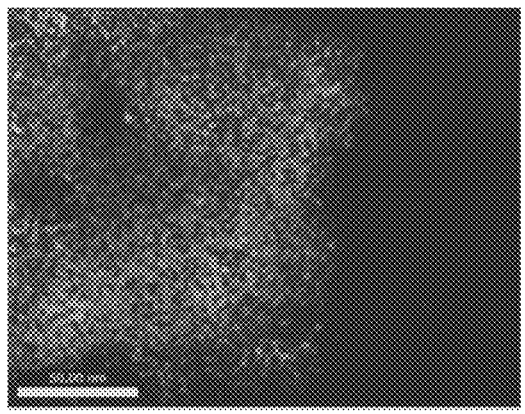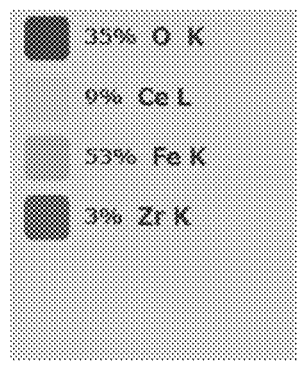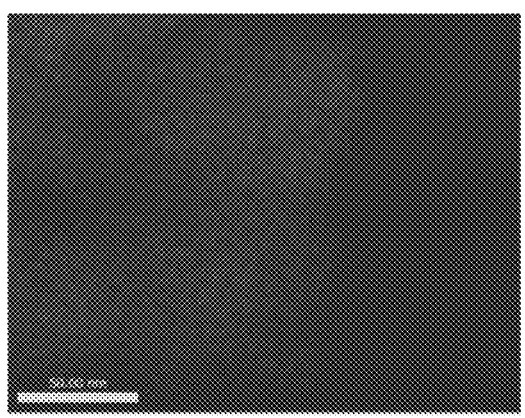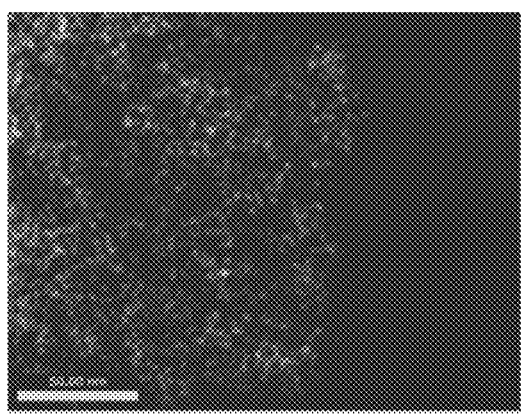

REDUCING AGENT AND METHOD FOR PRODUCING GAS

TECHNICAL FIELD

The present invention relates to a reducing agent and a method for producing a gas, and more specifically relates to a reducing agent that can be used, for example, in a chemical looping method, and a method for producing a gas using such a reducing agent.

BACKGROUND ART

In recent years, carbon dioxide, a kind of greenhouse gas, continues to increase in concentration in the atmosphere. The increase in concentration of carbon dioxide in the atmosphere contributes to global warming. Thus, recovery of carbon dioxide released into the atmosphere is important, and furthermore, reuse of the recovered carbon dioxide by converting it to a valuable substance could achieve a carbon-recycling society.

A method for producing carbon monoxide from carbon dioxide known in the art includes a method using a reverse water-gas shift reaction. However, this reverse water-gas shift reaction known in the art has a problem in that the reaction products, which are carbon monoxide and water, coexist in the system, and thus the conversion efficiency of carbon dioxide to carbon monoxide is reduced due to the constraint of the chemical equilibrium.

Thus, to solve the above problem, conversion of carbon dioxide to carbon monoxide (carbon monoxide synthesis) is performed using a chemical looping method. The chemical looping method referred to here is a method in which the above reverse water-gas shift reaction is divided into two reactions, a reduction reaction by hydrogen and a formation reaction of carbon monoxide from carbon dioxide, and these reactions are mediated by a metal oxide ($MO_x$) (see the following formulas).

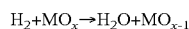

$H_2 + MO_x \rightarrow H_2O + MO_{x-1}$

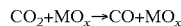

$CO_2 + MO_x \rightarrow CO + MO_x$

In the above formula, $MO_{x-1}$ represents the metal oxide that is in a partially or totally reduced state.

In the chemical looping method, during each reaction, water and carbon monoxide, which are substrates of the reverse reaction, do not coexist, and thus this would provide a higher conversion efficiency of carbon dioxide to carbon monoxide than the chemical equilibrium of the reverse water-gas shift reaction.

The metal oxide widely used to mediate the reactions in this chemical looping method includes a cerium oxide, which has oxygen ionic conductivity, and an iron oxide, which is highly reactive with carbon dioxide.

For example, Patent Literature 1 describes a method using a cerium oxide containing zirconium having reversible oxygen deficiency. In addition, Non-Patent Literature 1 describes a method using a mixed metal oxide of a cerium oxide containing zirconium and an iron oxide.

CITATION LIST

Patent Literature

Patent Literature 1: JP 5858926 B

Non-Patent Literature

Non-Patent Literature 1: Journal of $CO_2$ Utilization 17 (2017) 60-68

SUMMARY OF INVENTION

Technical Problem

In Patent Literature 1, however, a study has been conducted only on a cerium oxide doped with zirconium; a structural change of a cerium oxide doped with another metal or the associated change in energy required to produce oxygen defect has not been investigated, and the conversion efficiency of carbon dioxide to carbon monoxide is still insufficient.

In addition, in Non-Patent Literature 1, a method for preparing the mixed metal oxide of an iron oxide and a cerium oxide containing zirconium and their mixing ratios have not been fully studied. Thus, dispersion or ratios of the metal oxides may not be evenly distributed in the mixed metal oxide. Consequently, the interaction between the metal oxides necessary for the transfer of an oxygen ion and an electron may be impaired, and thus the method fails to increase the conversion efficiency of carbon dioxide to carbon monoxide.

The present invention has been made in view of such circumstances, and an object of the present invention is to provide a reducing agent that has a high conversion efficiency of carbon dioxide to carbon monoxide and can be used, for example, in a chemical looping method, and a method for producing a gas using such a reducing agent.

Solution to Problem

Such an object is achieved by the present invention described below.

(1) A reducing agent of the present invention is a reducing agent for use in production of a product gas containing carbon monoxide, the reducing agent being brought into contact with a raw material gas containing carbon dioxide to reduce the carbon dioxide to produce the product gas, and characterized by containing a composite metal oxide represented by $Ce_{1-x}(M)_xO_y$, where M is a metal element with an ionic radius smaller than an ionic radius of Ce with an identical valence number and an identical coordination number, x represents a positive real number, and y represents a real number from 1 to 4.

(2) In the reducing agent of the present invention, a difference between the ionic radius of Ce and the ionic radius of the metal element M is preferably more than 0 pm and 47 pm or less when the valence number is 3 and the coordination number is 6, and more than 0 pm and 24 pm or less when the valence number is 4 and the coordination number is 8.

(3) In the reducing agent of the present invention, the composite metal oxide preferably has oxygen ionic conductivity and has a function as an oxygen carrier.

(4) In the reducing agent of the present invention, the metal element M is preferably at least one selected from the group consisting of samarium (Sm), hafnium (Hf), yttrium (Y), gadolinium (Gd), niobium (Nb), praseodymium (Pr), titanium (Ti), neodymium (Nd), europium (Eu), silver (Ag), gold (Au), and scandium (Sc).

(5) In the reducing agent of the present invention, the x is preferably from 0.05 to 0.4.

(6) In the reducing agent of the present invention, an amount of the composite metal oxide is preferably 60 parts by mass or greater per 100 parts by mass of the reducing agent.

(7) The reducing agent of the present invention preferably further contains a support supporting the composite metal oxide, the support having oxygen ionic conductivity and having a function as an oxygen carrier.

(8) In the reducing agent of the present invention, the metal element M is preferably at least one selected from the group consisting of samarium (Sm), zirconium (Zr), and hafnium (Hf).

(9) In the reducing agent of the present invention, the support preferably contains at least one selected from the group consisting of vanadium (V), manganese (Mn), iron (Fe), titanium (Ti), molybdenum (Mo), yttrium (Y), chromium (Cr), lanthanum (La), cobalt (Co), nickel (Ni), copper (Cu), tungsten (W), niobium (Nb), and cerium (Ce).

(10) In the reducing agent of the present invention, an amount of the composite metal oxide is preferably 50 parts by mass or less per 100 parts by mass of the reducing agent.

(11) The reducing agent of the present invention is preferably used in production of a product gas containing carbon monoxide, the reducing agent being brought into contact with a raw material gas containing carbon dioxide to reduce the carbon dioxide to produce the reducing agent.

(12) In the reducing agent of the present invention, the oxidized reducing agent is preferably reduced by being brought into contact with a reducing gas containing hydrogen.

(13) The reducing agent of the present invention is preferably used separately in reaction steps of a reduction reaction of carbon dioxide and a reduction reaction of the oxidized reducing agent.

(14) A method for producing a gas of the present invention is characterized by reducing carbon dioxide by bringing the reducing agent of the present invention into contact with a raw material gas containing the carbon dioxide, to produce a product gas containing carbon monoxide.

Advantageous Effects of Invention

According to the present invention, a product gas containing carbon monoxide can be efficiently produced from a raw material gas containing carbon dioxide. In addition, the reducing agent of the present invention can be used, for example, in a chemical looping method.

BRIEF DESCRIPTION OF DRAWINGS

FIG. 1 is a set of images showing results of STEM-EDS analysis of a reducing agent obtained in Example B2.

DESCRIPTION OF EMBODIMENT

A reducing agent and a method for producing a gas of the present invention will be described in detail below based on preferred embodiments.
[Reducing Agent]
The reducing agent of the present invention is used in production of a product gas containing carbon monoxide, the reducing agent being brought into contact with a raw material gas containing carbon dioxide to reduce the carbon dioxide to produce the product gas (i.e., used in the method for producing a gas of the present invention). In addition, the reducing agent can be reduced (regenerated) by bringing the oxidized reducing agent into contact with a reducing gas.

At this time, preferably, the raw material gas and the reducing gas are alternately passed through a reaction tube (reaction vessel) packed with the reducing agent of the present invention such that the conversion of carbon dioxide to carbon monoxide by the reducing agent and the regeneration of the reducing agent in the oxidized state by the reducing gas are performed.

First Embodiment

A reducing agent of a first embodiment contains a composite metal oxide having a function as an oxygen carrier.

Here, the oxygen carrier refers to a compound that has oxygen ionic conductivity and can create reversible oxygen deficiency. The compound itself becomes deficient in an oxygen element by reduction, and, while the compound is in an oxygen element deficient state (reduced state), upon contact with carbon dioxide, the compound exhibits an effect of abstraction of an oxygen element from carbon dioxide and reduction of carbon dioxide.

The composite metal oxide in the present invention is represented by a general formula: $Ce_{1-x}(M)_xO_y$. In this general formula: $Ce_{1-x}(M)_xO_y$, M is a metal element that can have a valence number of 3 or 4, and the ionic radius is smaller than the ionic radius of Ce with an identical valence number and an identical coordination number.

In such a composite metal oxide, a difference between the ionic radius of Ce and the ionic radius of the metal element M is preferably more than 0 µm and 47 µm or less when the valence number is 3 and the coordination number is 6, and more than 0 µm and 24 µm or less when the valence number is 4 and the coordination number is 8.

For example, the ionic radius of $Ce^{4+}$ is 97 pm when the coordination number of each metal element is 8, and thus the metal element M is preferably a metal element, the tetravalent ion ($M^{4+}$) of which has an ionic radius of 73 µm or greater and less than 97 µm. In addition, the ionic radius of $Ce^{3+}$ is 101 pm when the coordination number of each metal element is 6, and thus the metal element M is preferably a metal element, the trivalent ion ($M^{3+}$) of which has an ionic radius of 54 µm or greater and less than 101 pm.

The composite metal oxide represented by the general formula: $Ce_{1-x}(M)_xO_y$ contains the metal element M that satisfies the conditions above, and such a configuration is believed to produce oxygen deficiency more efficiently and cause distortion in the lattice defect, and this distortion facilitates abstraction of an oxygen element from carbon dioxide.

In addition, a single metal oxide or its mixture easily adsorbs an impurity present in the raw material gas and the reducing gas and has low stability. In contrast, the composite metal oxide is less likely to adsorb an impurity and can maintain the ability of abstracting an oxygen element from carbon dioxide over a long period of time. As a result, this can increase the conversion efficiency of carbon dioxide to carbon monoxide by the reducing agent.

Here, x is a positive real number and is preferably from 0.05 to 0.4, more preferably from 0.1 to 0.25, and even more preferably from 0.1 to 0.19. In this case, oxygen deficiency is more likely to occur in the composite metal oxide, and the degree of distortion in the lattice defect is likely to be moderate.

In addition, y is a real number from 1 to 4, preferably a real number from 1 to 3, and more preferably a real number from 1 to 2. In this case, the stability of the composite metal oxide is likely to improve.

The difference between the ionic radius of Ce and the ionic radius of the metal element M is preferably more than 0 μm and 47 μm or less when each metal element has a valence number of 3 and a coordination number of 6, and more than 0 μm and 24 μm or less when each metal element has a valence number of 4 and a coordination number of 8. In both cases, the difference is more preferably more than 0 μm and 20 μm or less, even more preferably more than 0 μm and 15 μm or less, and particularly preferably more than 1 μm and 8 μm or less.

When the difference is in the range as described above, it is believed that the release of the metal element M from the composite metal oxide can be prevented and moderate distortion can be generated in the lattice defect of the composite metal oxide.

Examples of such a metal element M include samarium (Sm), zirconium (Zr), hafnium (Hf), yttrium (Y), gadolinium (Gd), niobium (Nb), praseodymium (Pr), titanium (Ti), neodymium (Nd), europium (Eu), silver (Ag), gold (Au), and scandium (Sc). Among these, the metal element M is preferably at least one selected from the group consisting of samarium (Sm), hafnium (Hf), yttrium (Y), gadolinium (Gd), niobium (Nb), praseodymium (Pr), titanium (Ti), neodymium (Nd), europium (Eu), silver (Ag), gold (Au), and scandium (Sc), and more preferably at least one selected from the group consisting of samarium, zirconium, and hafnium. Using the above metal as the metal element M can generate a lattice defect having sufficient distortion and can significantly increase the conversion efficiency of carbon dioxide to carbon monoxide by the reducing agent.

The ionic radius of each metal ion is 84 pm for $Zr^{4+}$ with a coordination number of 8, 83 pm for $Hf^{4+}$ with a coordination number of 8, 79 pm for $Nb^{4+}$ with a coordination number of 8, 74 pm for $Ti^{4+}$ with a coordination number of 8, 95.8 pm for $Sm^{3+}$ with a coordination number of 6, 90 pm for $Y^{3+}$ with a coordination number of 6, 93.8 pm for $Gd^{3+}$ with a coordination number of 6, 98.3 pm for $Nd^{3+}$ with a coordination number of 6, 99 pm for $Pr^{3+}$ with a coordination number of 6, 94.7 pm for $Eu^{3+}$ with a coordination number of 6, 75 pm for $Ag^{3+}$ with a coordination number of 6, 85 pm for $Au^{3+}$ with a coordination number of 6, and 74.5 pm for $Sc^{3+}$ with a coordination number of 6.

The amount of the composite metal oxide is preferably 60 parts by mass or greater, more preferably 80 parts by mass or greater, even more preferably 90 parts by mass or greater, and may be 100 parts by mass, per 100 parts by mass of the reducing agent. When the amount of the composite metal oxide present in the reducing agent is in the above range, the conversion of carbon dioxide to carbon monoxide by the reducing agent can be promoted, that is, the conversion efficiency can be further increased.

Examples of an embodiment in which the entire reducing agent is not solely composed of the composite metal oxide include an embodiment in which fine particles of the composite metal oxide are bonded with a binder (support). The binder is any binder that is less likely to be denatured by the raw material gas, or depending on reaction conditions or the like, and is not particularly limited. Specific examples of the binder include carbon materials (such as graphite and graphene), zeolite, montmorillonite, $SiO_2$, $ZrO_2$, $TiO_2$, $V_2O_5$, MgO, $Al_2O_3$, or composite oxides containing these.

A packing density of the reducing agent is preferably 1.1 g/mL or less, more preferably from 0.4 to 1 g/mL, and even more preferably from 0.5 to 0.9 g/mL. When the packing density is too small, this would increase the rate of the gas passage too much and reduce the time of contact of the reducing agent with the raw material gas and the reducing gas. As a result, this is likely to reduce the conversion efficiency of carbon dioxide to carbon monoxide by the reducing agent and the regeneration efficiency of the reducing agent in an oxidized state by the reducing gas. On the other hand, when the packing density is too high, this would reduce the rate of the gas passage too much, making it difficult for the reaction to proceed or requiring a longer time to produce the product gas.

A pore volume of the reducing agent is preferably 0.4 $cm^3/g$ or greater, more preferably from 1 to 30 $cm^3/g$, and even more preferably from 5 to 20 $cm^3/g$. When the pore volume is too small, this would make it difficult for the raw material gas and the reducing gas to enter the inside of the reducing agent. As a result, a contact area of the reducing agent with the raw material gas and the reducing gas would be reduced, which is likely to reduce the conversion efficiency of carbon dioxide to carbon monoxide by the reducing agent and the regeneration efficiency of the reducing agent in an oxidized state by the reducing gas. On the other hand, even if the pore volume is increased beyond this upper limit, no further effect enhancement can be expected, and the mechanical strength would tend to decrease depending on the type of reducing agent.

A form of the reducing agent is not particularly limited but is preferably, for example, granular. When the reducing agent is in the granular form, the packing density of the reducing agent is easily adjusted to the above range.

Here, the granular form is a concept encompassing powdery, particulate, lump, and pelleted forms, and its shape may be any of spherical, plate-like, polygonal, crushed, columnar, needle-like, scaly shapes, and the like.

An average particle size of the reducing agent is preferably from 1 μm to 5 mm, more preferably from 10 μm to 1 mm, and even more preferably from 20 μm to 0.5 mm. The reducing agent with such an average particle size is likely to have the packing density in the above range.

In the present specification, the average particle size means an average value of the particle sizes of any 200 particles of the reducing agent in one field of view observed with an electron microscope. Here, the "particle size" means the maximum length of distances between two points on an outline of the reducing agent. When the reducing agent is columnar, the maximum length of distances between two points on the outline of its end face is taken as the "particle size". In addition, when the reducing agent is in a shape of lump or the like and is an aggregate of the primary particles, for example, the average particle size means the average particle size of the secondary particles.

A BET specific surface area of the reducing agent is preferably from 1 to 500 $m^2/g$, more preferably from 3 to 450 $m^2/g$, and even more preferably from 5 to 400 $m^2/g$. The reducing agent with a BET specific surface area within the above range facilitates the improvement of the conversion efficiency of carbon dioxide to carbon monoxide by the reducing agent.

In addition, in the first embodiment, the distortion in the lattice deficiency of the composite metal oxide can be sufficiently large, and thus this can maintain the oxygen capacity of the reducing agent at a high value in a wide range of temperatures (from a low temperature of approximately 400° C. to a high temperature of approximately 650° C.). That is, the reducing agent can efficiently convert carbon dioxide to carbon monoxide in a wide temperature range.

The oxygen capacity of the reducing agent at 400° C. is preferably from 1 to 40 mass % and more preferably from 2 to 30 mass %. When the oxygen capacity of the reducing agent at a low temperature is in the above range, it means that the oxygen capacity is sufficiently high also at the temperature during the actual operation (approximately 650° C.), and the reducing agent is believed to have an extremely high conversion efficiency of carbon dioxide to carbon monoxide.

[Method for Producing Reducing Agent of First Embodiment]

Next, a method for producing the reducing agent of the first embodiment will be described.

The method for producing the reducing agent is not particularly limited, but examples include a sol-gel method, a co-precipitation method, a solid-phase method, and a hydrothermal synthesis method.

As an example, the reducing agent can be produced as follows, for example. First, a salt of the metal element that is to constitute the reducing agent is dissolved in water to prepare an aqueous solution. The aqueous solution is then allowed to gel, then dried and fired. That is, the reducing agent of the present invention can be easily and reliably produced by what is called a sol-gel method.

To prepare the aqueous solution, for example, an acidic water adjusted to be acidic with citric acid, acetic acid, malic acid, tartaric acid, hydrochloric acid, nitric acid, a mixture of these, or the like may be used.

Examples of the salt of the metal element include nitrates, sulfates, chlorides, hydroxides, carbonates, or complexes of these, but among these, the salt of the metal element is preferably a nitrate. In addition, for the salt of the metal element, a hydrate may be used as necessary.

The gel should be dried preferably at a temperature of 20 to 200° C. and more preferably at a temperature of 50 to 150° C., and preferably for a time duration of 0.5 to 20 hours and more preferably for a time duration of 1 to 15 hours. Drying as described above can uniformly dry the gel.

The gel should be fired preferably at a temperature of 300 to 1200° C. and more preferably at a temperature of 350 to 800° C., and preferably for a time duration of 1 to 24 hours and more preferably for a time duration of 1.5 to 20 hours. The gel is preferably formed into an oxide by firing but can be easily converted to the reducing agent by firing under the above firing conditions. In addition, firing under the above firing conditions can also prevent excessive particle growth of the reducing agent.

The temperature should be increased at a temperature increase rate of 1 to 20° C./min and preferably at a temperature increase rate of 2 to 10° C./min until the above firing temperature is reached. This promotes the growth of the particles of the reducing agent and can avoid cracking of the crystal (particles).

Second Embodiment

A reducing agent of a second embodiment contains a support having a function as an oxygen carrier and a composite metal oxide supported on this support.

As described in the first embodiment, the oxygen carrier refers to a compound that has oxygen ionic conductivity and can create reversible oxygen deficiency. The compound itself becomes deficient in an oxygen element by reduction, and, while the compound is in an oxygen element deficient state (reduced state), upon contact with carbon dioxide, the compound exhibits an effect of abstraction of an oxygen element from carbon dioxide and reduction of carbon dioxide.

On the other hand, the composite metal oxide of the second embodiment preferably has a function of causing oxygen deficiency (defect) generated by abstracting an oxygen element from the support to move (migrate) more efficiently in the support and retaining the oxygen deficiency, through interaction with the support having a function as an oxygen carrier. In addition, the composite metal oxide itself is not involved, or only partially involved, in the reaction and thus preferably also has a function as a structure holder of the reducing agent.

The support having a function as an oxygen carrier itself thus has a sufficiently high conversion efficiency of carbon dioxide to carbon monoxide, and the support further supporting the composite metal oxide increases the rate of the migration of the oxygen deficiency in the support and can further increase the conversion efficiency.

[[Support]]

A compound (oxygen carrier) constituting the support is any compound that can cause reversible oxygen deficiency and is not particularly limited, but is preferably a metal oxide represented by a general formula: $M1O_y$.

In the above general formula: $M1O_y$, M1 represents at least one of metal elements belonging to groups 2 to 13 of the periodic table, and y represents a positive real number. Here, y is preferably from 0.5 to 6, more preferably from 1 to 5, and even more preferably from 1 to 4.

The compound represented by the general formula: $M1O_y$ can form a compound represented by a general formula: $M1O_{y-n}$ by reduction using the reducing gas. In the general formula: $M1O_y$-n, M1 and y are the same as those in the general formula: $M1O_y$, and n is a positive real number.

In addition, n is typically a value smaller than y, preferably from 0.05 to 5, more preferably from 0.1 to 3, and even more preferably from 0.15 to 2.

The compound represented by the general formula: $M1O_y$ is reduced through the contact with the reducing gas and converted to the general formula: $M1O_{y-n}$. The compound represented by the general formula: $M1O_{y-n}$ is oxidized by contact with the raw material gas containing carbon dioxide and is converted to the compound represented by the general formula: $M1O_y$. This enables the reducing agent to be used in a cycle of the reduction reaction of carbon dioxide and the reduction reaction of the reducing agent.

The compound constituting the support is, as described above, any compound that is reduced from $M1O_y$ to $M1O_{y-n}$ and oxidized from $M1O_{y-n}$ to $M1O_y$ and is not particularly limited. The compound that can be thus oxidized and reduced can be used in a system involving reduction reaction of carbon dioxide, such as a chemical looping method.

The metal element M1 contained in the compound constituting the support is an element having a plurality of oxidation concept states. Here, the "metal element having a plurality of oxidation concept states" means a metal element that can take a plurality of valences, for example, such as $Fe^{2+}$ and $Fe^{3+}$ in the case of iron (Fe).

Examples of the metal element M1 contained in the compound constituting the support include metal elements belonging to groups 3 to 12 of the periodic table. The metal element M1 is preferably at least one selected from the group consisting of vanadium (V), manganese (Mn), iron (Fe), titanium (Ti), molybdenum (Mo), yttrium (Y), chromium (Cr), lanthanum (La), cobalt (Co), nickel (Ni), copper (Cu), tungsten (W), niobium (Nb), and cerium (Ce). Among these, the metal element M 1 is preferably cerium, chromium, iron, or the like. Using the support composed of the compound having such a metal element M1 further increases the conversion efficiency of carbon dioxide to carbon monoxide and facilitates the reaction even at a relatively low temperature.

The compound constituting the support may be amorphous or may have crystallinity. In addition, the crystal may have any structure.

[[Composite Metal Oxide]]

In the second embodiment, the composite metal oxide is a compound that causes the oxygen deficiency to migrate in the support and is a compound represented by a general formula: $Ce_{1-x}(M)_xO_y$. In the composite metal oxide, metal elements constituting the composite metal oxide are compounded, and thus they are arranged close to each other. Therefore, the composite metal oxide efficiently interacts with the support and thus has an excellent oxygen deficiency migration effect in the support. In contrast, in a mixture of single metal oxides, their particles are in contact with each other only in the vicinity of the surface, and this makes it difficult to increase the interaction between the metal elements and cannot increase the oxygen deficiency migration effect. Note that the composite metal oxide is a compound different from the compound constituting the support.

In the above general formula: $Ce_{1-x}(M)_xO_y$, M is a metal element that can have a valence number of 3 or 4, and the ionic radius is smaller than the ionic radius of Ce with an identical valence number and an identical coordination number.

In such a composite metal oxide, a difference between the ionic radius of Ce and the ionic radius of the metal element M is preferably more than 0 μm and 47 μm or less when the valence number is 3 and the coordination number is 6, and more than 0 μm and 24 μm or less when the valence number is 4 and the coordination number is 8.

For example, the ionic radius of $Ce^{4+}$ is 97 pm when the coordination number of each metal element is 8, and thus the metal element M is preferably a metal element, the tetravalent ion ($M^{4+}$) of which has an ionic radius of 73 μm or greater and less than 97 μm. In addition, the ionic radius of $Ce^{3+}$ is 101 pm when the coordination number of each metal element is 6, and thus the metal element M is preferably a metal element, the trivalent ion ($M^{3+}$) of which has an ionic radius of 54 μm or greater and less than 101 pm.

The composite metal oxide represented by the general formula: $Ce_{1-x}(M)_xO_y$ contains the metal element M that satisfies the above conditions, and distortion is generated in the lattice defect and, to compensate for the distortion, the interaction force with the support increases. Thus, this facilitates smooth migration of the oxygen deficiency in the support.

In addition, a single metal oxide or its mixture easily adsorbs an impurity present in the raw material gas and the reducing gas and has low stability. In contrast, the composite metal oxide is less likely to adsorb an impurity and can maintain the migration ability for the oxygen deficiency over a long period of time. As a result, this can increase the conversion efficiency of carbon dioxide to carbon monoxide by the reducing agent.

Here, x is a positive real number and is preferably from 0.1 to 0.8 and more preferably from 0.3 to 0.7. In this case, the degree of distortion in the lattice defect of the composite metal oxide is likely to be moderate.

In addition, y is a real number from 1 to 4, preferably a real number from 1 to 3, and more preferably a real number from 1 to 2. In this case, the stability of the composite metal oxide is likely to improve.

The difference between the ionic radius of Ce and the ionic radius of the metal element M is preferably more than 0 μm and 47 μm or less when each metal element has a valence number of 3 and a coordination number of 6, and more than 0 μm and 24 μm or less when each metal element has a valence number of 4 and a coordination number of 8, but in both cases, the difference is more preferably more than 1 μm and 20 μm or less and even more preferably more than 5 μm and 15 μm or less.

When the difference is in the range as described above, it is believe that the release of the metal element M from the composite metal oxide can be prevented, and moderate distortion can be generated in the lattice defect of the composite metal oxide.

Examples of such a metal element M include samarium (Sm), zirconium (Zr), hafnium (Hf), yttrium (Y), gadolinium (Gd), niobium (Nb), praseodymium (Pr), lanthanum (La), titanium (Ti), indium (In), neodymium (Nd), and scandium (Sc). Among these, the metal element M is preferably at least one selected from the group consisting of samarium (Sm), zirconium (Zr), and hafnium (Hf), and more preferably at least one selected from the group consisting of samarium, zirconium, and hafnium. Using the above metal as the metal element M can sufficiently accelerate the migration of oxygen deficiency and thus can significantly increase the conversion efficiency of carbon dioxide to carbon monoxide by the reducing agent.

The ionic radius of each metal ion is 84 pm for $Zr^{4+}$ with a coordination number of 8, 83 pm for $Hf^{4+}$ with a coordination number of 8, 79 pm for $Nb^{4+}$ with a coordination number of 8, 74 pm for $Ti^{4+}$ with a coordination number of 8, 95.8 pm for $Sm^{3+}$ with a coordination number of 6, 90 pm for $Y^{3+}$ with a coordination number of 6, 93.8 pm for $Gd^{3+}$ with a coordination number of 6, 99 pm for $Pr^{3+}$ with a coordination number of 6, 80 pm for $In^{3+}$ with a coordination number of 6, 98.3 pm for $Nd^{3+}$ with a coordination number of 6, and 74.5 pm for $Sc^{3+}$ with a coordination number of 6.

An amount of the composite metal oxide is preferably 50 parts by mass or less, more preferably 40 parts by mass or less, even more preferably 30 parts by mass or less, and particularly preferably from 10 to 25 parts by mass, per 100 parts by mass of the reducing agent. When the quantitative relationship between the support and the composite metal oxide is in the above range, the conversion of carbon dioxide to carbon monoxide by the support is allowed to proceed and the migration of oxygen deficiency in the support by the composite metal oxide is promoted. Thus, this can further increase the conversion efficiency of carbon dioxide to carbon monoxide by the reducing agent. If the amount of the composite metal oxide is too large (in other words, if the amount of the support is too small), the time duration during which the high conversion efficiency of carbon dioxide to carbon monoxide can be maintained tends to be short.

The packing density of the reducing agent and the pore volume of the reducing agent are similar to those of the first embodiment above.

In addition, the form of the reducing agent, the average particle size of the reducing agent, and the BET specific surface area of the reducing agent are similar to those of the first embodiment above, including the definitions and suitable ranges.

In addition, in the second embodiment, the composite metal oxide can promote the migration of oxygen deficiency in the support and thus can maintain the oxygen capacity of the reducing agent at a high level in a wide range of temperatures (from a low temperature of approximately 400° C. to a high temperature of approximately 650° C.). That is, the reducing agent can efficiently convert carbon dioxide to carbon monoxide in a wide temperature range.

The oxygen capacity of the reducing agent at 400° C. is preferably from 1 to 40 mass % and more preferably from 2 to 30 mass %. When the oxygen capacity of the reducing agent at a low temperature is in the above range, it means that the oxygen capacity is sufficiently high also at a temperature during the actual operation (approximately 650° C.), and the reducing agent is believed to have an extremely high conversion efficiency of carbon dioxide to carbon monoxide.

[Method for Producing Reducing Agent of Second Embodiment]

Next, a method for producing the reducing agent of the second embodiment will be described.

The reducing agent formed by supporting the composite metal oxide on the support can be produced as follows. First, salts of the metal elements constituting the support and the composite metal oxide are dissolved in an acidic water to prepare an aqueous solution. The aqueous solution is then allowed to gel, then dried and fired. That is, the reducing agent of the second embodiment can be easily and reliably produced by what is called a sol-gel method.

Examples of an acid used to prepare the acidic water include citric acid, acetic acid, malic acid, tartaric acid, hydrochloric acid, nitric acid, or a mixture of these.

Examples of the salt of the metal element include nitrates, sulfates, chlorides, hydroxides, carbonates, or complexes of these, but among these, the salt of the metal element is preferably a nitrate. In addition, for the salt of the metal element, a hydrate may be used as necessary.

The gel should be dried preferably at a temperature of 20 to 200° C. and more preferably at a temperature of 50 to 150° C., and preferably for a time duration of 0.5 to 20 hours and more preferably for a time duration of 1 to 15 hours. Drying as described above can uniformly dry the gel.

The gel should be fired preferably at a temperature of 300 to 1200° C. and more preferably at a temperature of 350 to 800° C., and preferably for a time duration of 1 to 24 hours and more preferably for a time duration of 1.5 to 20 hours. The gel is preferably formed into an oxide by firing but can be easily converted to the support and the composite metal oxide by firing under the above firing conditions. In addition, firing under the firing conditions above can also prevent excessive particle growth of the reducing agent.

The temperature should be increased at a temperature increase rate of 1 to 20° C./min and preferably at a temperature increase rate of 2 to 10° C./min until the firing temperature above is reached. This promotes the growth of the particles of the reducing agent and can avoid cracking of the crystal (particles).

At this time, when the amount of the salt of the metal element constituting the support is sufficiently greater than the amount of the salt of the metal element constituting the composite metal oxide, the support is formed as a core, and the composite metal oxide supported on this core is formed. In this case, the composite metal oxide is believed to cover the periphery of the support (core part) or be distributed in granular form dispersedly on the periphery of the support (core part) and form a surface layer (shell part).

[Method for Using Reducing Agent]

The reducing agent of the present invention can be used, for example, in a chemical looping method as described above. In addition, the reducing agent of the present invention can be used in applications of reducing carbon dioxide as described above.

More specifically, both the reduction reaction of carbon dioxide and the reduction reaction of the reducing agent are desirably performed, and the reducing agent is preferably used in a cycle between the reduction reaction of carbon dioxide and the reduction reaction of the reducing agent. In the reduction reaction of the reducing agent, another reducing agent (reducing gas) is used.

In addition, the reducing agent of the present invention is preferably used in what is called reverse water-gas shift reaction. The reverse water-gas shift reaction is a reaction that produces carbon monoxide and water from carbon dioxide and hydrogen. When a chemical looping method is employed, the reverse water-gas shift reaction is divided into the reduction reaction of the reducing agent (first process) and the reduction reaction of carbon dioxide (second process); the reduction reaction of the reducing agent is a reaction represented by Scheme (A1) below [first embodiment] or Scheme (A2) below [second embodiment], and the reduction reaction of carbon dioxide is a reaction represented by Scheme (B1) below [first embodiment] or Scheme (B2) below [second embodiment].

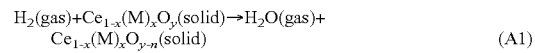

$$H_2(gas)+Ce_{1-x}(M)_xO_y(solid)\rightarrow H_2O(gas)+Ce_{1-x}(M)_xO_{y-n}(solid) \quad (A1)$$

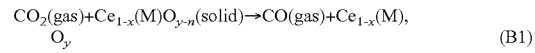

$$CO_2(gas)+Ce_{1-x}(M)O_{y-n}(solid)\rightarrow CO(gas)+Ce_{1-x}(M),O_y \quad (B1)$$

where in Schemes (A1) and (B1), n is typically a value smaller than 2, preferably from 0.05 to 1.7, more preferably from 0.1 to 1.5, and even more preferably from 0.15 to 1.3.

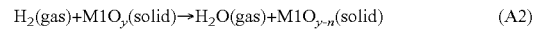

$$H_2(gas)+M1O_y(solid)\rightarrow H_2O(gas)+M1O_{y-n}(solid) \quad (A2)$$

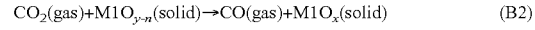

$$CO_2(gas)+M1O_{y-n}(solid)\rightarrow CO(gas)+M1O_x(solid) \quad (B2)$$

where in Schemes (A2) and (B2), M1, y, and n are each the same as those described above.

That is, in the reduction reaction of the reducing agent represented by Scheme (A1) or Scheme (A2) above, hydrogen, a kind of reducing gas, is oxidized to form water. In addition, in the reduction reaction of carbon dioxide represented by Scheme (B1) or Scheme (B2) above, carbon dioxide is reduced to form carbon monoxide.

A reaction temperature in the reduction reaction of the reducing agent is any temperature at which the reduction reaction can proceed but is preferably 300° C. or higher, more preferably 400° C. or higher, even more preferably 500° C. or higher, and particularly preferably 550° C. or higher. In such a temperature range, the efficient reduction reaction of the reducing agent is allowed to proceed.

An upper limit of this reaction temperature is preferably 850° C. or lower, more preferably 750° C. or lower, and even more preferably 700° C. or lower. Setting the upper limit of the reaction temperature to the above range can improve the economic efficiency.

In addition, a reaction temperature in the reduction reaction of carbon dioxide is preferably 300° C. or higher, more preferably 350° C. or higher, and even more preferably 400° C. or higher. In such a temperature range, the efficient reduction reaction of carbon dioxide can be allowed to proceed.

An upper limit of this reaction temperature is preferably 1000° C. or lower, more preferably 850° C. or lower, even more preferably 700° C. or lower, and particularly preferably 650° C. or lower. The reducing agent enables the reduction reaction of carbon dioxide to carbon monoxide to proceed with high efficiency even at a low temperature, and thus the reduction reaction of carbon dioxide can be set at a relatively low temperature. In addition, setting the upper limit of the reaction temperature to the above range not only facilitates the use of waste heat but also can further improve the economic efficiency.

In the present invention, a reduction product obtained by the reduction reaction of carbon dioxide may be a substance other than carbon monoxide; specifically, examples include methane. The reduction product, such as carbon monoxide, obtained by the above reduction reaction of carbon dioxide is preferably further converted to an organic material or the like by microbial fermentation or the like. Examples of the microbial fermentation include anaerobic fermentation. Examples of the organic material that can be obtained include methanol, ethanol, acetic acid, butanol, derivatives of these, or mixtures of these, and C5 or higher compounds, such as isoprene.

Furthermore, the reduction product, such as carbon monoxide, may be converted by a metal oxide or the like to a C1 to C20 compound including a hydrocarbon or an alcohol, which has been synthesized by petrochemistry in a related art. Specific examples of the compound that can be obtained include methane, ethane, propylene, methanol, ethanol, propanol, acetaldehyde, diethyl ether, acetic acid, butyric acid, diethyl carbonate, and butadiene.

[Properties of Reducing Agent]

The reducing agent of the present invention preferably has properties as described below.

That is, when the reducing agent is packed in a stainless-steel reaction tube to a height of 40 cm, the reaction tube having an inner diameter of 8 mm and being equipped with a pressure gauge in its flow path, and nitrogen gas with a concentration of 100 volume % is passed through the reaction tube at 30 mL/min, the pressure increase in 10 minutes is preferably 0.03 MPaG or less and more preferably 0.01 MPaG or less.

For the reducing agent exhibiting such properties, the packing density and the pore volume are considered to satisfy the ranges described above, and the reducing agent can sufficiently increase the conversion efficiency of carbon dioxide to carbon monoxide.

The reducing agent and the method for producing a gas of the present invention have been described above, but the present invention is not limited to these.

For example, the reducing agent and the method for producing a gas of the present invention may have any other additional configuration for the above embodiments, may be replaced by any configuration exhibiting a similar function, or one or some configurations may be omitted.

EXAMPLES

The present invention will be further specifically described below with reference to examples and comparative examples, but the present invention is not limited to these examples.

Example A1

A1. Production of Reducing Agent

First, 1.94 g of samarium (III) nitrate hexahydrate (available from FUJIFILM Corporation, purity: 99.9%) and 12.61 g of cerium (III) nitrate hexahydrate (available from Sigma-Aldrich Co. LLC, purity: 99.0%) were dissolved in 100 mL of distilled water, and an aqueous solution was obtained.

This aqueous solution was then slowly added dropwise under vigorous stirring to 200 mL of a solution containing 10.29 g of sodium carbonate (80° C.).

A precipitate was then filtered out of the solution and washed repeatedly with distilled water until the pH of the filtrate reached 7 (neutral).

Next, to increase the BET specific surface area of the reducing agent and increase the dispersibility of samarium (dopant), the precipitate was immersed in 200 mL of n-butanol under stirring, and n-butanol was removed by heating at 80° C. Suspending the precipitate in n-butanol can control the particle size and uniformly disperse cerium and samarium in the reducing agent.

Next, a recovered material was further dried in an oven at 120° C. for 10 hours and then fired in a muffle furnace at 500° C. for 6 hours.

Finally, the fired lump was finely milled mechanically, and a target reducing agent was obtained. The reducing agent was granular.

A2. Identification of Reducing Agent

A2-1. Specific Surface Area

The specific surface area of the reducing agent was measured by adsorption/desorption of nitrogen using a Brunauer-Emmett-Teller (BET) Analyzer (BELSORP Mini2).

A2-2. X-Ray Diffraction (XRD)

Crystallographic data were collected with a RINT-TTR III diffractometer (CuKα radiation, 50 kV, 300 mA).

The result showed that the obtained reducing agent was composed of $Ce_{0.85}Sm_{0.15}O_y$ (y is a real number from 1 to 2).

That is, $Ce_{0.85}Sm_{0.15}O_y$ (composite metal oxide) accounted for approximately 100 parts by mass per 100 parts by mass of the reducing agent.

Example A2

A reducing agent was produced in the same manner as in Example A1 except that the amount of samarium (Sm) contained in the composite metal oxide was 10 mol %. The reducing agent was granular.

Example A3

A reducing agent was produced in the same manner as in Example A2 except that the metal element contained in the composite metal oxide was changed from samarium (Sm) to gadolinium (Gd). Gadolinium chloride hexahydrate (available from FUJIFILM Wako Pure Chemical Corporation, purity: 99.9%) was used as a precursor of the composite metal oxide. In addition, the reducing agent was granular.

Example A4

Particles of a composite metal oxide represented by $Ce_{0.8}Gd_{0.2}O_y$ (y is a real number from 1 to 2) ("CEO-GD20-01", available from American Elements) were used as the reducing agent. $Ce_{0.8}Gd_{0.2}O_y$ (composite metal oxide) accounted for approximately 100 parts by mass per 100 parts by mass of the reducing agent.

Example A5

A reducing agent was produced in the same manner as in Example A2 except that the metal element contained in the composite metal oxide was changed from samarium (Sm) to yttrium (Y). Yttrium nitrate hexahydrate (available from FUJIFILM Wako Pure Chemical Corporation, purity: 99.999%) was used as a precursor of the composite metal oxide. In addition, the reducing agent was granular.

Example A6

A reducing agent was produced in the same manner as in Example A2 except that the metal element contained in the composite metal oxide was changed from samarium (Sm) to praseodymium (Pr). Praseodymium nitrate n-hydrate (available from FUJIFILM Wako Pure Chemical Corporation, purity: 99.5%) was used as a precursor of the composite metal oxide. In addition, the reducing agent was granular.

Example A7

A reducing agent was produced in the same manner as in Example A2 except that the metal element contained in the composite metal oxide was changed from samarium (Sm) to hafnium (Hf). Hafnium chloride (available from FUJIFILM Wako Pure Chemical Corporation, purity: 99.5%) was used as a precursor of the composite metal oxide. In addition, the reducing agent was granular.

Comparative Example A1

A reducing agent was produced in the same manner as in Example A1 except that a change was made so that samarium (Sm) was not contained in the composite metal oxide. The reducing agent was granular.

Comparative Example A2

A reducing agent was produced in the same manner as in Example A2 except that the metal element contained in the composite metal oxide was changed from samarium (Sm) to aluminum (Al). Aluminum (III) nitrate nonahydrate (available from FUJIFILM Wako Pure Chemical Corporation, purity: 99.9%) was used as a precursor of the composite metal oxide. In addition, the reducing agent was granular.

Comparative Example A3

A reducing agent was produced in the same manner as in Example A2 except that the metal element contained in the composite metal oxide was changed from samarium (Sm) to lanthanum (La). Lanthanum nitrate hexahydrate (available from FUJIFILM Wako Pure Chemical Corporation, purity: 99.9%) was used as a precursor of the composite metal oxide. In addition, the reducing agent was granular.

Comparative Example A4

A reducing agent was produced in the same manner as in Example A2 except that the metal element contained in the composite metal oxide was changed from samarium (Sm) to vanadium (V). Vanadium (III) chloride (available from FUJIFILM Wako Pure Chemical Corporation, purity: 95.0%) was used as a precursor of the composite metal oxide. In addition, the reducing agent was granular.

A3. Evaluation of Reducing Agent Characteristics (Conversion Efficiency)

Characteristics of the reducing agent were evaluated by the following procedures using a rapid catalyst screening system ("Single μ-Reactor Rx-3050SR" available from Frontier Laboratories Ltd.) equipped with a microreactor and a gas chromatograph/mass spectrometer (GC/MS) directly connected to the microreactor.

First, 0.2 g of each reducing agent was packed in a quartz reaction tube with an inner diameter of 3 mm and a length of 78 mm. The temperature was then increased at a temperature increase rate of 40° C./min while helium gas was flowed at a flow rate of 20 mL/min, and the reducing agent was heated for 20 minutes.

Next, hydrogen gas (reducing gas) was passed through the microreactor at a flow rate of 30 mL/min for 20 minutes and thus the reduction reaction of the reducing agent (first process) was performed, and the reducing agent was reduced. At this time, the gas discharged from the outlet of the microreactor contained water vapor.

Then, after feeding helium gas at a flow rate of 20 mL/min for 10 minutes to exchange gas, carbon dioxide gas was fed at a flow rate of 3 mL/min for 20 minutes, and thus the reduction reaction of carbon dioxide (second process) was performed, and carbon dioxide gas (raw material gas) was reduced. At this time, the product gas discharged from the outlet of the reactor contained carbon monoxide.

Helium gas was then fed at a flow rate of 20 mL/min for 10 minutes to exchange gas.

In the present test, when feeding any of these gases, the microreactor was maintained at a temperature of 550° C., and was operated under atmospheric pressure conditions.

The conversion efficiency of carbon dioxide to carbon monoxide by the reducing agent was calculated by the following equation.

Note that the conversion efficiency is an average conversion efficiency per one minute after starting the flow of carbon dioxide gas into the quartz reaction tube.

$$X_{CO} (\%) = n_{CO,out}/(n_{CO2,in}) \times 100$$

where in the above equation, n is a mole fraction of carbon dioxide or carbon monoxide in the raw material gas or the product gas.

In addition, the selectivity of the reaction is 100%, and thus $$\text{total } n_{CO2} = n_{CO2,in} + n_{CO,out}.$$

Note that, in Table 1, the value of $X_{CO}$ of the reducing agent of each of Examples A1 to A7 and Comparative Examples A2 to A4 is expressed as a relative value ($X_{CO}$, r) when the value of $X_{CO}$ of the reducing agent of Comparative Example A1 is set to "1".

The measurement conditions in the gas chromatograph/mass spectrometer were as follows.

Column temperature: 200° C.
Injection temperature: 200° C.
Detector temperature: 250° C.
Column: EGA Tube (L: 2.5 m, φ (inner diameter): 0.15 mm, t: 0 mm)
Column flow rate: 1.00 mL/min
Split ratio: 250
Purge flow rate: 3.0 mL/min These results are shown in Table 1 below.

TABLE 1

| | Reducing agent [Composite metal oxide: $Ce_{1-x}M_xO_y$] | | | | | | | | |
|---|---|---|---|---|---|---|---|---|---|
| | Ce | | | M | | | | Difference in ionic radius from Ce [pm] | Conversion efficiency $(X_{CO,r})$ 550° C. |
| | Coordination number | Valence number | Content [mol %] | Species | Coordination number | Valence number | Content [mol %] | | |
| Example A1 | 6 | 3 | 85 | Sm | 6 | 3 | 15 | 5.2 | 2.01 |
| Example A2 | 6 | 3 | 90 | Sm | 6 | 3 | 10 | 5.2 | 1.86 |
| Example A3 | 6 | 3 | 90 | Gd | 6 | 3 | 10 | 7.2 | 2.02 |
| Example A4 | 6 | 3 | 80 | Gd | 6 | 3 | 20 | 7.2 | 1.07 |
| Example A5 | 6 | 3 | 90 | Y | 6 | 3 | 10 | 11 | 1.14 |
| Example A6 | 8 | 4 | 90 | Pr | 8 | 4 | 10 | 1 | 1.54 |
| Example A7 | 8 | 4 | 90 | Hf | 8 | 4 | 10 | 14 | 1.56 |
| Comparative Example A1 | 8 | 4 | 100 | — | — | — | — | — | 1.00 |
| Comparative Example A2 | 6 | 3 | 90 | Al | 6 | 3 | 10 | 47.5 | 0.56 |
| Comparative Example A3 | 6 | 3 | 90 | La | 6 | 3 | 10 | −2.2 | 0.35 |
| Comparative Example A4 | 8 | 4 | 90 | V | 8 | 4 | 10 | 25 | 0.62 |

The reducing agent in each example had a high conversion efficiency of carbon dioxide to carbon monoxide. In addition, changing the species and amount of the metal element M (doped metal element) constituting the reducing agent enabled adjustment of the conversion efficiency of carbon dioxide to carbon monoxide.

In contrast, the reducing agent of each comparative example had a low conversion efficiency of carbon dioxide to carbon monoxide.

Example B1

B1. Production of Reducing Agent

First, as precursors of a reducing agent, 36.12 g of iron (III) nitrate nonahydrate (available from FUJIFILM Wako Pure Chemical Corporation, purity: 99.9%), 2.58 g of zirconium (II) oxynitrate dihydrate (available from Kishida Chemical Co., Ltd., purity: 99.0%), and 4.20 g of cerium (III) nitrate hexahydrate (available from Sigma-Aldrich Co. LLC, purity: 99.0%) were each weighed.

Then, 27.42 g of citric acid (available from FUJIFILM Wako Pure Chemical Corporation, purity: 99.5%) was weighed, dissolved in 200 mL of deionized water, and a citric acid aqueous solution was obtained. The precursor (metal nitrate) was then added to the citric acid aqueous solution at 65° C. under stirring.

After a lapse of 30 minutes, 3.78 g of ethylene glycol (available from FUJIFILM Wako Pure Chemical Corporation, purity: 99.5%) was added to the citric acid aqueous solution, and the temperature was increased to 80° C. The molar ratio of metal:citric acid:ethylene glycol was 1:1.2: 0.48.

The temperature of 80° C. was maintained under continuous stirring until a viscous gel was formed. The gel was then transferred to a drying oven.

The gel was dried at 100° C. for 20 hours.

A swollen lump of the produced organic and inorganic compounds was crushed and fired at 750° C. for 4 hours at a rate of 3° C./min.

Finally, the fired lump was finely crushed mechanically, and a target reducing agent was obtained. The reducing agent was granular.

B2. Identification of Reducing Agent

B2-1. Specific Surface Area

The specific surface area of the reducing agent was measured by adsorption/desorption of nitrogen using a Brunauer-Emmett-Teller (BET) Analyzer (BELSORP Mini2).

B2-2. X-Ray Diffraction (XRD)

Crystallographic data were collected with a RINT-TTR III diffractometer (CuKα radiation, 50 kV, 300 mA).

In the XRD data of the reducing agent immediately after production, diffraction peaks corresponding to the $Fe_2O_3$ (33.158, 35.618, 40.858, 49.488, 54.098) and $Ce_{0.5}Zr_{0.5}O_y$ (29.108, 33.708, 48.508, 57.508) phases were clearly confirmed.

The diffraction peaks of $Fe_2O_3$ was clearly identified whereas the diffraction peak of $CeO_2$ (28.558) was absent, and thus $Ce_{0.5}Zr_{0.5}O_y$ (y is a real number from 1 to 2) was clearly distinguished. However, the diffraction peaks of $Ce_{0.5}Zr_{0.5}O_y$ closely overlapped with other diffraction peaks of $CeO_2$ (33.088, 47.478, 56.338).

Thus, the absence of the $CeO_2$ phase was further confirmed using relative intensity ratio calculation of the XRD data. The XRD result showed the presence of Ce in the solid solution of Ce and Zr.

Other individual diffraction peaks of $ZrO_2$ were not confirmed.

The above results revealed that the obtained reducing agent had a structure containing a support represented by $Fe_2O_3$ and a composite metal oxide represented by $Ce_{0.5}Zr_{0.5}O_y$ supported on this support.

The amount of $Ce_{0.5}Zr_{0.5}O_y$ (composite metal oxide) was 22.33 parts by mass per 100 parts by mass of the reducing agent (i.e., the amount of the composite metal oxide contained in the reducing agent was 22.33 mass %).

In addition, the amount of Fe (metal element M1) was 50 parts by mass per 100 parts by mass of the reducing agent (i.e., the amount of the metal element M1 contained in the reducing agent was 50 mass %).

Example B2

A reducing agent was produced in the same manner as in Example B1 except that the amount of zirconium (Zr) contained in the composite metal oxide was 10 mol %. The reducing agent was granular.

Example B3

A reducing agent was produced in the same manner as in Example B1 except that the metal element contained in the composite metal oxide was changed from zirconium (Zr) to samarium (Sm). The reducing agent was granular.

Example B4

A reducing agent was produced in the same manner as in Example B1 except that the metal element contained in the composite metal oxide was changed from zirconium (Zr) to hafnium (Hf). The reducing agent was granular.

Example B5

A reducing agent was produced in the same manner as in Example B1 except that the amount of iron (Fe) contained in the reducing agent was changed from 50 mass % to 40 mass %. The reducing agent was granular.

Example B6

A reducing agent was produced in the same manner as in Example B1 except that the amount of iron (Fe) contained in the reducing agent was changed from 50 mass % to 30 mass %. The reducing agent was granular.

Example B7

A reducing agent was produced in the same manner as in Example B1 except that the amount of iron (Fe) contained in the reducing agent was changed from 50 mass % to 20 mass %. The reducing agent was granular.

Example B8

A reducing agent was produced in the same manner as in Example B1 except that the amount of iron (Fe) contained in the reducing agent was changed from 50 mass % to 10 mass %. The reducing agent was granular.

Example B9

A reducing agent was produced in the same manner as in Example B1 except that iron (Fe) contained in the support was changed to cerium (Ce). The support is composed of $Ce_2O_3$. The reducing agent was granular.

Comparative Example B1

A reducing agent was produced in the same manner as in Example B1 except that a change was made to omit the composite metal oxide. The reducing agent was granular.

Comparative Example B2

A reducing agent was produced in the same manner as in Example B9 except that a change was made to omit the composite metal oxide. The reducing agent was granular.

B3. Evaluation of Reducing Agent Characteristics (Conversion Efficiency)

Characteristics of the reducing agent were evaluated by the following procedures using a rapid catalyst screening system ("Single μ-Reactor Rx-3050SR" available from Frontier Laboratories Ltd.) equipped with a microreactor and a gas chromatograph/mass spectrometer (GC/MS) directly connected to the microreactor.

First, 0.2 g of the reducing agent was packed in a quartz reaction tube with an inner diameter of 3 mm and a length of 78 mm. The temperature was then increased at a temperature increase rate of 40° C./min to 650° C. while helium gas was fed at a flow rate of 20 mL/min, and the reducing agent was heated for 20 minutes.

Next, hydrogen gas (reducing gas) was passed through the microreactor at a flow rate of 30 mL/min for 20 minutes and thus the reduction reaction of the reducing agent (first process) was performed, and the reducing agent was reduced. At this time, the gas discharged from the outlet of the reactor contained water vapor.

Then, after feeding helium gas was at a flow rate of 20 mL/min for 10 minutes to exchange gas, then carbon dioxide gas was fed at a flow rate of 3 mL/min for 20 minutes, and thus the reduction reaction of carbon dioxide (second process) was performed, and carbon dioxide gas (raw material gas) was reduced. At this time, the product gas discharged from the outlet of the reactor contained carbon monoxide.

Helium gas was then fed at a flow rate of 20 mL/min for 10 minutes to exchange gas.

In the present test, the microreactor was maintained at a temperature of 650° C. or 550° C., and was operated under atmospheric pressure conditions.

The conversion efficiency of carbon dioxide to carbon monoxide by the reducing agent was calculated by the following equation.

Note that the conversion efficiency is an average conversion efficiency per one minute after starting the flow of carbon dioxide gas into the quartz reaction tube.

$$X_{CO}(\%) = n_{CO,out}/(n_{CO2,in}) \times 100$$

where in the above equation, n is a mole fraction of carbon dioxide or carbon monoxide in the raw material gas or the product gas.

In addition, the selectivity of the reaction is 100%, and thus $$\text{total } n_{CO2} = n_{CO2,in} + n_{CO,out}.$$

Note that, in Table 2, the value of $X_{CO}$ of the reducing agent of each of Examples B1 to B8 is expressed as a relative value ($X_{CO,r}$) when the value of $X_{CO}$ of the reducing agent of Comparative Example B1 is set to "1", and the value of $X_{CO}$ of the reducing agent of Example B9 is expressed as a relative value ($X_{CO,r}$) when the value of $X_{CO}$ of the reducing agent of Comparative Example B2 is set to "1".

The measurement conditions in the gas chromatograph/mass spectrometer were as follows.

Column temperature: 200° C.
Injection temperature: 200° C.
Detector temperature: 250° C.
Column: EGA Tube (L: 2.5 m, φ (inner diameter): 0.15 mm, t: 0 mm)
Column flow rate: 1.00 mL/min
Split ratio: 250
Purge flow rate: 3.0 mL/min These results are shown in Table 2 below.

TABLE 2

| | Support | | Ce | | | M | | | | Difference in ionic radius from Ce [pm] | $Ce_{1-x}M_xO_y$ amount in reducing agent [mass %] | Conversion efficiency ($X_{CO,r}$) 650° C. | Conversion efficiency ($X_{CO,r}$) 550° C. |
|---|---|---|---|---|---|---|---|---|---|---|---|---|---|
| | Species of M1 | M1 amount in reducing agent [mass %] | Coordination number | Valence number | Content [mol %] | Species | Coordination number | Valence number | Content [mol %] | | | | |
| Example B1 | Fe | 50 | 8 | 4 | 50 | Zr | 8 | 4 | 50 | 13 | 22.33 | 1.56 | — |
| Example B2 | Fe | 50 | 8 | 4 | 90 | Zr | 8 | 4 | 10 | 13 | 22.33 | — | — |
| Example B3 | Fe | 50 | 6 | 3 | 90 | Sm | 6 | 3 | 10 | 5.2 | 22.33 | 1.50 | — |
| Example B4 | Fe | 50 | 8 | 4 | 90 | Hf | 8 | 4 | 10 | 14 | 22.33 | — | — |
| Comparative Example B1 | Fe | 69.94 | | | | — | | | | | 0 | 1.00 | — |
| Example B5 | Fe | 40 | 8 | 4 | 50 | Zr | 8 | 4 | 50 | 13 | 33.54 | 1.41 | — |
| Example B6 | Fe | 30 | 8 | 4 | 50 | Zr | 8 | 4 | 50 | 13 | 44.73 | 1.23 | — |
| Example B7 | Fe | 20 | 8 | 4 | 50 | Zr | 8 | 4 | 50 | 13 | 55.93 | — | — |
| Example B8 | Fe | 1 | 8 | 4 | 50 | Zr | 8 | 4 | 50 | 13 | 67.13 | 1.81 | — |
| Example B9 | Ce | 50 | 8 | 4 | 50 | Zr | 8 | 4 | 50 | 13 | 22.33 | 1.28 | 2.10 |
| Comparative Example B2 | Ce | 81.4 | | | | — | | | | | 0 | 1.00 | 1.00 |

The reducing agent in each example had a high conversion efficiency of carbon dioxide to carbon monoxide. In addition, changing the species of the metal element M (doped metal element) constituting the composite metal oxide or the amount of the metal element M1 constituting the oxygen carrier enabled adjustment of the conversion efficiency of carbon dioxide to carbon monoxide.

In contrast, the reducing agent of each comparative example had a low conversion efficiency of carbon dioxide to carbon monoxide. The value of $X_{CO}$ at 650° C. in Comparative Example B2 was about 1.78 times the value of $X_{CO}$ at 650° C. in Comparative Example B1.

B3. Confirmation of Distribution State of Each Element in Reducing Agent

Mapping measurement by STEM-EDS analysis was performed on the reducing agent obtained in Example B2 using a transmission electron microscope (HD2700).

The results are shown in FIG. 1.

Good distribution state (high dispersibility) of each element was confirmed in comparison with the distribution state of each element shown in FIG. 2 of Non-Patent Literature 1. Given this difference in the distribution state, the reducing agent of the present invention was expected to improve the conversion efficiency of carbon dioxide to carbon monoxide.

The invention claimed is:

1. A reducing agent for use in production of a product gas containing carbon monoxide, the reducing agent being brought into contact with a raw material gas containing carbon dioxide to reduce the carbon dioxide to produce the product gas, the reducing agent comprising:
a composite metal oxide represented by $Ce_{1-x}(M)_xO_y$, where M is a metal element with an ionic radius smaller than an ionic radius of Ce with an identical valence number and an identical coordination number, x represents a positive real number, and y represents a real number from 1 to 4, and
a support supporting the composite metal oxide, the support having oxygen ionic conductivity and having a function as an oxygen carrier, wherein the support comprises at least one selected from the group consisting of vanadium (V), manganese (Mn), molybdenum (Mo), yttrium (Y), chromium (Cr), lanthanum (La), cobalt (Co), nickel (Ni), copper (Cu), tungsten (W), and niobium (Nb).

2. The reducing agent according to claim 1, wherein a difference between the ionic radius of Ce and the ionic radius of the metal element M is more than 0 μm and 47 μm or less when the valence number is 3 and the coordination number is 6, and more than 0 μm and 24 μm or less when the valence number is 4 and the coordination number is 8.

3. The reducing agent according to claim 2, wherein the composite metal oxide has oxygen ionic conductivity and has a function as an oxygen carrier.

4. The reducing agent according to claim 2, wherein the metal element M is at least one selected from the group consisting of samarium (Sm), hafnium (Hf), yttrium (Y), gadolinium (Gd), niobium (Nb), praseodymium (Pr), titanium (Ti), neodymium (Nd), europium (Eu), silver (Ag), gold (Au), and scandium (Sc).

5. The reducing agent according to claim 2, wherein the x is from 0.05 to 0.4.

6. The reducing agent according to claim 2, wherein an amount of the composite metal oxide is 60 parts by mass or greater per 100 parts by mass of the reducing agent.

7. The reducing agent according to claim 1, wherein the metal element M is at least one selected from the group consisting of samarium (Sm), zirconium (Zr), and hafnium (Hf).

8. The reducing agent according to claim 1, wherein an amount of the composite metal oxide is 50 parts by mass or less per 100 parts by mass of the reducing agent.

9. The reducing agent according to claim 1, wherein the reducing agent is used in production of a product gas containing carbon monoxide, the reducing agent being brought into contact with a raw material gas containing carbon dioxide to reduce the carbon dioxide to produce the product gas.

10. The reducing agent according to claim 9, wherein the oxidized reducing agent is reduced by being brought into contact with a reducing gas containing hydrogen.

11. The reducing agent according to claim 10, wherein the reducing agent is used separately in reaction steps of a reduction reaction of carbon dioxide and a reduction reaction of the oxidized reducing agent.

12. A method for producing a gas, the method comprising reducing carbon dioxide by bringing the reducing agent described in claim 1 into contact with a raw material gas containing the carbon dioxide, to produce a product gas containing carbon monoxide.

* * * * *